Feb. 15, 1966  S. FRIEDMAN  3,234,675
VIEWING DEVICES
Filed July 16, 1963  2 Sheets-Sheet 1
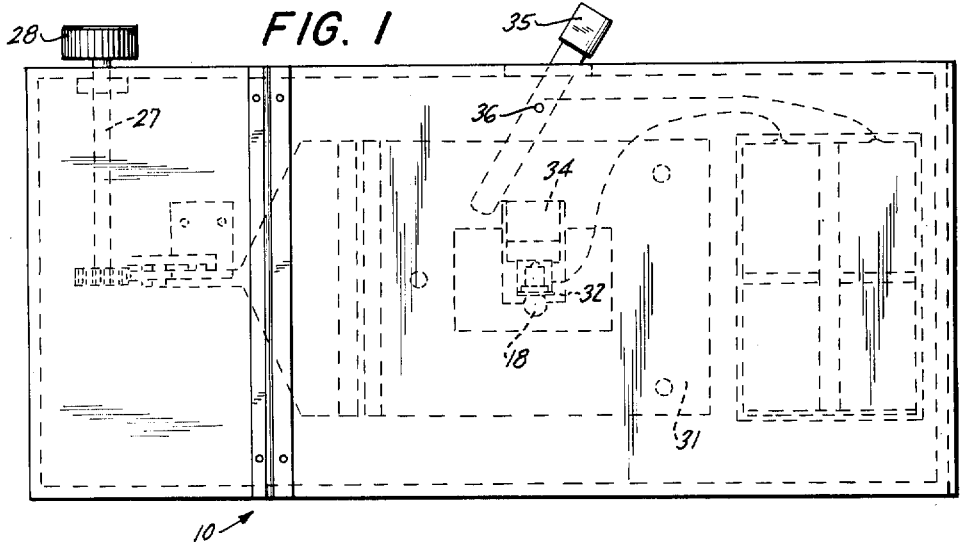
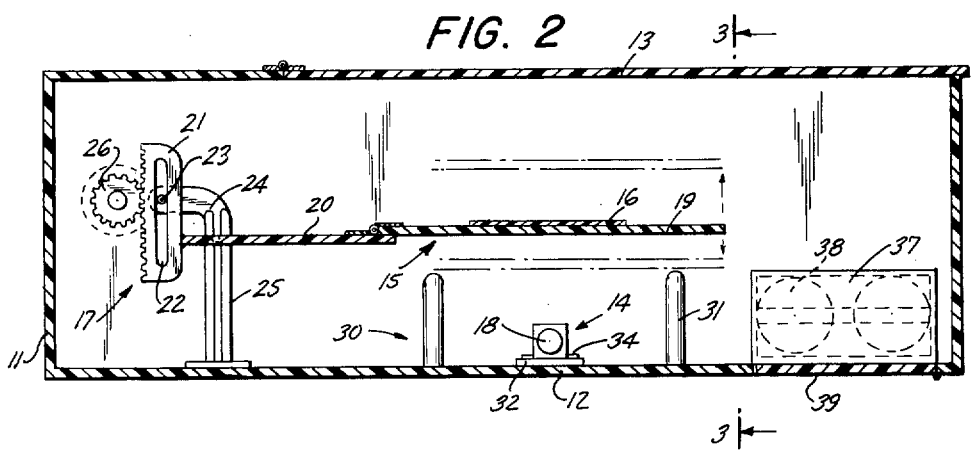
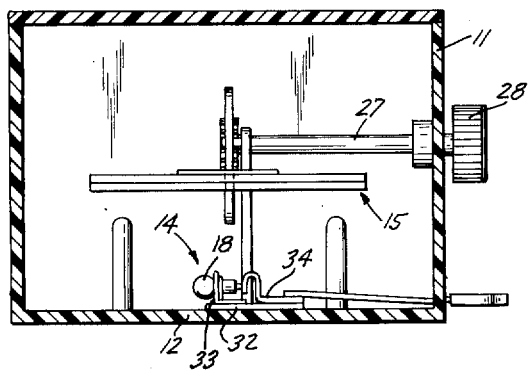
INVENTOR.
Sol Friedman
BY
Michael S. Striker
Atty Feb. 15, 1966  S. FRIEDMAN  3,234,675
VIEWING DEVICES
Filed July 16, 1963  2 Sheets-Sheet 2

INVENTOR.
Sol Friedman

BY Michael J. Striker

United States Patent Office 3,234,675
Patented Feb. 15, 1966

3,234,675
VIEWING DEVICES
Sol Friedman, 10 Ronald Drive, Monsey, N.Y.
Filed July 16, 1963, Ser. No. 295,307
1 Claim. (Cl. 40—106.52)

The present invention relates to viewing devices.

Thus, the present invention relates to devices which make it possible to view an image, which may be enlarged, of a transparency or the like.

Although viewing devices of the above general type are well known, they are all relatively expensive since they include lens assemblies which of course require adjustment so as to provide a sharp image, and in addition such known structures are relatively complex with respect to the placing in the devices of articles whose images are to be projected.

A primary object of the present invention is to provide an extremely inexpensive and simple viewing device capable of providing an image of an article on a translucent sheet the front of which is visible to the viewer.

Another object of the present invention is to provide a device of this type which requires no lenses.

A further object of the present invention is to provide a device of this type which can be quickly and easily adjusted so as to regulate the size of the image.

An additional object of the present invention is to provide a viewing device which makes it very simple to quickly and easily insert into the device an article whose image is to be projected as well as to remove the article from the device and replace it with another article.

A still further object of the present invention is to provide a structure of the above type which is capable of projecting images, not only of transparencies and the like, but also of opaque articles which when placed in the device can have a silhouette image of the outline of the article projected with the structure of the invention.

It is furthermore an object of the present invention to provide a structure which enables an image of an article to be quickly and rapidly shifted between a pair of positions in a manner which will give at the front of the translucent sheet which receives the image an impression of movement of the image.

It is also among the objects of the present invention to provide a structure of the above type which is so simple and inexpensive that not only can it be used for providing enlarged images of relatively small transparencies, for example, but also the device can be used as a toy for entertainment and education of young people.

With these objects in view the invention includes, in a viewing device, a translucent sheet means the front face of which is visible to the viewer of the device, and a pair of means located behind the translucent sheet means and consisting of a substantially pin-point light source means and a support means for supporting between the light source means and the sheet means an article whose image is to be projected onto the sheet means to be visible at the front thereof. An adjusting means is operatively connected to one of the abovementioned pair of means for adjusting the position thereof relative to the sheet means so that in this way when an adjustment is made the image seen at the front of the sheet means will change, and thus it is possible with the structure of the invention either to enlarge or contract an image or to give an impression of movement, as will be apparent from the description below.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

FIG. 1 is a top plan view of one possible embodiment of a structure according to the present invention;

FIG. 2 is a longitudinal, sectional elevation of the structure of FIG. 1;

FIG. 3 is a transverse sectional view of the structure of FIGS. 1 and 2 taken along line 3—3 of FIG. 2 in the direction of the arrow;

Figure 4:
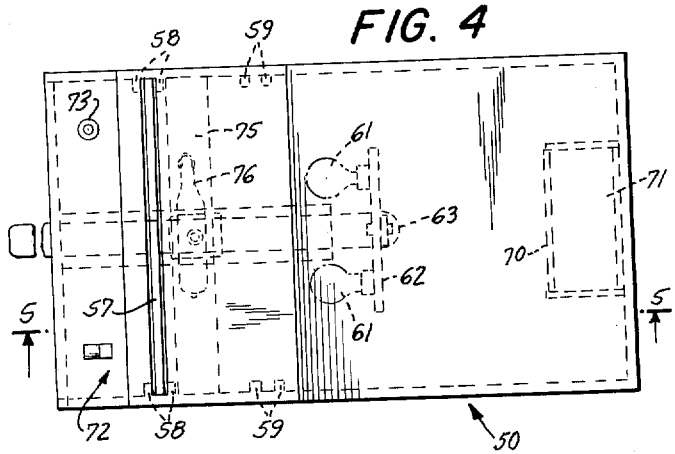
FIG. 4 is a top plan view of another embodiment of the device according to the present invention.

Referring to FIGS. 1–3, the viewing device 10 illustrated therein includes a housing 11 made of any suitable plastic material, for example, and this housing 11 has a top wall formed in part by a cover 13 which is hingedly connected to the remainder of the top wall of the substantially rectangular housing 11 so that the cover 13 can be turned from the closed position illustrated in FIG. 2 upwardly to an open position giving access to the interior of the housing 11. The cover 13 forms a translucent sheet means, the front upper face of which is visible to the viewer of the device 10. Thus, the cover 13 may be formed of a matted plastic which, of course, is not clearly transparent but instead has a frosted appearance so that an image can be formed on the sheet means 13.

Within the housing 11, next to its bottom wall 12, is located a substantially pin-point light source means 14 in the form of a relatively small lamp 18 the filament of which is extremely short so that this small lamp 18 will have the characteristics of a pin-poin light source.

Between the light source means 14 and the translucent sheet means 13 is located a support means 15 in the form of a transparent plate 19, and of course the light from the lamp 18, when the latter is energized, will pass freely through the support means 15. This support means 15 is adapted to carry an article such as a transparency 16, and thus when the light source means 14 is energized an image of the article 16 will be visible at the front of the translucent sheet means 13.

An adjusting means 17 is operatively connected to the support means 15 for adjusting the position of the latter relative to the sheet means 13 and the stationary light source 14, and FIG. 2 illustrates in dot-dash lines different positions to which the support means 15 may be moved. The manually-operable adjusting means 17 maintains the transparent plate 19 parallel to the sheet means 13 while adjusting the distance between the plate 19 and the sheet means 13. Thus, as the support means 15 is lowered toward the light source 14 so that its distance from the sheet means 13 increases, the image of the transparency 16 at the sheet means 13 will become enlarged, while during movement of the support means 15 toward the sheet means 13, this image will contract, and thus it becomes possible with this construction to control the size of the image which appears at the translucent sheet means 13.

It is pointed out that the transparent plate 19 need not carry only transparencies. For example, an opaque article of a suitable configuration can be placed on the plate 19, and in this case the image which appears at the front of the sheet means 13 will be a silhouette showing the outline of the opaque article, which is to say also the configuration of its periphery, and in this case also the image which is in the form of a silhouette, can be enlarged or contracted by adjusting the position of the support means 15 relative to the light source 14 and the sheet means 13.

The manually-operable adjusting means 17 includes a fairly rigid plate 20 to which the transparent plate 19 is hingedly connected so that this plate 19 can be turned upwardly from the position shown in FIG. 2. The plate 20 is rigidly fixed with an elongated rack 21 which is formed with a slot 22 receiving a pin 23 fixedly carried by a standard 24 which is fixedly mounted on the bottom wall 12 of the housing 11, and the plate 20 fixedly carries a pin which is guided in an elongated slot 25 formed in the standard 24 and extending vertically, as shown in FIG. 2. The rack 21 meshes with a pinion 26 fixedly carried by a shaft 27 which extends through a suitable bearing in a sidewall of the housing 11 to the exterior thereof where the shaft 27 fixedly carries a knob 28 which is accessible to the operator. Thus, when the operator turns the knob 28 the elevation of the plate 19 will be adjusted, and thus the size of the image, whether the image is a silhouette or a transparency or the like, can be adjusted. It should be noted that while the knob 28 is relatively easy to turn, nevertheless the friction of the components of the adjusting means 17 is sufficient to maintain the plate 19 at the elevation in which it is placed by turning of the knob 28, without requiring any additional friction devices for this purpose.

The bottom wall 12 of the housing 11 carries a limiting means 30 which limits the extent to which the support means 19 can be lowered. Thus, it will be seen that the bottom wall 12 fixedly carries a plurality of posts 31 which form the limiting means 30, and these posts are arranged with two of the posts on the right and one post on the left of the light source, as viewed in FIG. 1. The height of the post 31 is such that they will be engaged by the lower face of the plate 19 before the latter can engage the light source 14 or any of the electrical structure connected therewith and described below.

Also, the entire inner surface of the housing 11, with the exception of the top wall or cover 13 thereof, is coated with a dark material such as a suitable black paint or the like which has a dull surface, so that in this way the light projects the image against a dark background.

The light source means formed by the relatively small lamp 18 is carried by an electrically conductive, substantially L-shaped bracket 32 (FIG. 3) formed in its upstanding leg with an opening through which the base of the lamp 18 can be threaded, and this base of the lamp thus makes electrical contract with the element 32 which is mounted on a suitable, electrically non-conductive plate 33 carried by the bottom wall 12 of the housing 11. It should be noted that the entire housing 11 can be made of an electrically non-conductive plastic. The plate 33 carries a springy member 34 having a substantially U-shaped spring portion engaged by the contact at the end of the lamp 18. The member 34 is adapted to be engaged by a manually-operable switch member 35 which is pivoted at 36 (FIG. 1) on the bottom wall 12 and which extends through a suitable slot in a side wall of the housing 11 to the exterior thereof where a free end of the switch 35 is accessible. When this switch member 35 is turned by the opertion in a counterclockwise direction, as viewed in FIG. 1, the inner end of the switch member will engage the electrically conductive element 34 so as to complete a circuit through the lamp 18 and energize the latter. The housing 11 is provided in its interior with a compartment 37 in which several batteries 38 are housed, and the bottom wall 12 carries a removable section 39 which can be removed in any suitable way to give access to the compartment 37 for inserting and removing batteries therefrom. These batteries are electrically connected in the manner shown in dotted lines in FIG. 1 on the one hand to the switch member 35 and on the other hand to the element 32 which carries the lamp 18, so that when the switch member 35 engages the element 34 a circuit is completed through the lamp to energize the latter, and thus it is only necessary for the operator to turn the switch member 35 in order to energize or de-energize the substantially pin-point light source means 14.

The operation of the above-described structure is believed to be clear. In order to provide on the sheet means 13 an image of a desired article, this sheet means or cover 13 is simply turned up from the position shown in FIG. 2, and then the operator will place on the transparent support means 19 an article such as a transparency 16 whose image is to be projected. Then the operator will close the switch so as to energize the light source 14, and an image of the article will be visible at the front of the sheet means 13 which has in the meantime been returned to its closed position shown in FIG. 2. The operator can then turn the knob 28 so as to adjust the size of the image in the manner described above. If it should become necessary to replace the lamp 18, after the operator turns the cover 13 to its open position, the operator can also turn the plate 19 upwardly from the position shown in FIG. 2, so that in this way the operator has free access to the lamp 18 in order to replace the latter. Also, the door 39 may be removed whenever it is necessary to change the batteries 38 which are in the compartment 37.

Figure 5:
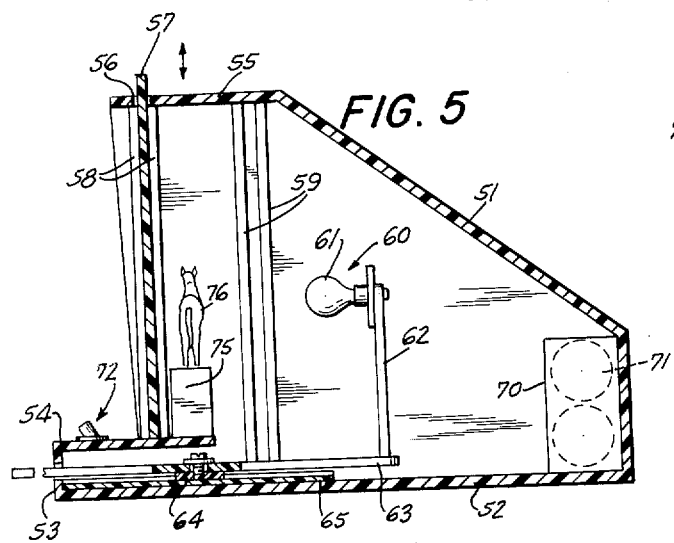
FIG. 5 is a longitudinal sectional elevation of the structure of FIG. 4, taken along line 5—5 of FIG. 4 in the direction of the arrows.
Figure 7:
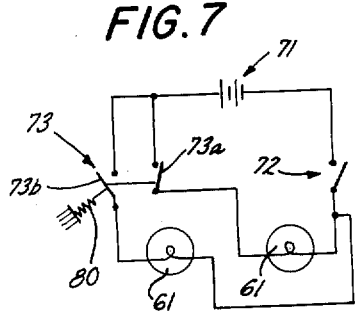
FIG. 7 is a wiring diagram of the pair of light sources which form part of the structure of FIGS. 4–6.
Figure 6:
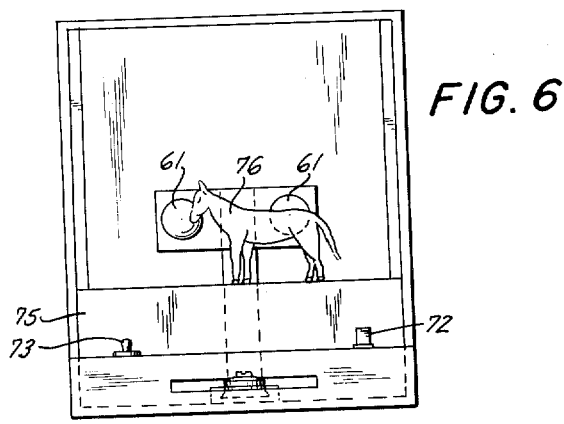
FIG. 6 is a front end view of the structure of FIGS. 4 and 5, as seen from the left of FIGS. 4 and 5.

The embodiment of the invention which is illustrated in FIGS. 5–7 is capable of producing results similar to the embodiment of FIGS. 1–3 except that in the embodiment of FIGS. 5–7 it is the light source which moves while the support means for the transparency or the like remains stationary. As may be seen from FIGS. 5–7, the viewing device 50 illustrated therein includes a housing 51 having an upper wall portion which inclines downwardly toward the rear, as is apparent particularly from FIG. 5. The housing 51 is open at its front in that the space between the side walls of the housing and beneath the top wall 55 thereof is open. However, the bottom wall 52 fixedly carries at its front end an upwardly directed wall portion 53 of limited height to which is connected a horizontal supporting wall 54 which extends rearwardly from the short front wall 53, which extends across the entire housing 51, into the housing 51 between the side walls thereof. The top wall 55 is formed with an elongated slot 56 extending almost all the way between the side walls of the housing, and a translucent sheet means 57, which may be made of the same material as the sheet means 13, is capable of being slipped through the slot 56 so that the bottom edge of the sheet means 57 rests on the wall 54, and thus the sheet means 57 can close the open front end of the housing 51. The opposite side walls of the housing 51 each carry a pair of guide ribs 58 between which a side edge of the sheet means 57 is guided, so that in this way the sheet means 57 is maintained in a vertical position closing the open front of the housing.

The side walls of the housing 51 also each fixedly carry a pair of parallel vertical ribs 59, and when the sheet means 57 is moved it is possible to place a transparency or the like in the interior of the housing with the opposed side edges of the transparency respectively received between the pairs of ribs 59 so that in this way these ribs 59 serve to support in a vertical position a transparency or the like located in the interior of the housing at a predetermined distance behind the sheet means 57 which can be placed in the position shown in FIG. 5 after the transparency has been introduced into the housing.

Within the housing 51 it is also located a substantially pin-point light source means 60 in the form of a small lamp 61 having an extremely small filament providing a light source whose characteristics are those of a pin-point source of light. The lamp 61 is carried by a support means 62 which is in turn carried by an adjusting means in the form of an elongated bar 63 which extends through a suitably elongated horizontal slot formed in the front wall portion 53, so that the front end of the bar 63 is accessible to the operator. The bar 63 is pivotally carried by a block 64 which has opposed dove-tail side edges received in a dove-tail slot formed in the elongated member 65 fixed to the wall 52 and extending rearwardly from the wall 53 substantially midway between the side walls of the housing 51, so that in this way the operator can push or pull the bar 63 so as to determine the distance between the light source 60 and the sheet means 57, so that in this way the image of the transparency can be enlarged or contracted in the manner described above in connection with FIGS. 1-3. Of course, this adjustment of the distance between the light source and the sheet means involves shifting of the block 64 along the slot 65. It is also possible to turn the bar 63 at its pivotal connection to the block 64 so that in this way the lateral position of the light source 60 with respect to the transparency can be regulated, and in this way an impression of lateral movement of the image can be obtained.

In accordance with a further feature of the present invention, there are provided in the embodiment of FIGS. 5-7 a plurality of light sources 60, and in the illustrated example there are in fact a pair of lamps 61 carried by the support 62 which is of a substantially T-shaped configuration having a horizontal upper member carrying a pair of light sources 61 at a predetermined space from each other, and the vertical leg of the support is fixed to and extends upwardly from the bar 63, as is particularly apparent from FIG. 6. The housing 51 carries at its rear interior portion a compartment 70 in which batteries 71 are situated, and the rear vertical wall portion of the housing 51 may have a removable door through which access may be had to the compartment 70 for replacing the battery 71, when required.

The wall 54 carries a pair of switches 72 and 73 which are capable of being manually actuated. The switch 72 when closed will cause the right lamp 61 of FIG. 6 to be energized, for example, although the circuit could be so arranged that the other lamp is energized, if desired, while pressing on the switch 73 will cause the right lamp 61 to be extinguished and the left lamp 61 to be energized. Thus by rapidly pressing and releasing the switch 73 it is possible to alternately illuminate the pair of lamps 61.

Instead of placing a transparency in the housing 51, as described above, it is possible to place on the innermost portion of the supporting wall 54 a stage 75 in the form of an elongated rectangular member resting on the wall 54 and extending between the side walls of the housing, and the operator may place on this stage any suitable three dimensional figure such as a small three dimensional figure 76 of a horse. With this arrangement, the translucent sheet means 57 is replaced in the position shown in FIG. 5 and the operator will close the switch 72 so that the right lamp 61 will be energized, as viewed in FIG. 6, and thus the opaque figure 76 will have its silhouette projected onto the sheet means 57. Then the operator can rapidly depress and release the switch 73 so that the image of the figure on the stage 75 will alternately come from the pair of light sources 61 which are situated differently with respect to the figure 76, so that as the light sources are alternately energized the image appearing at the sheet means 57 will shift to the right and left through a slight distance, and in addition, because of the three-dimensional characteristics of the figure 76, the positions of the legs of the figure with respect to each other will change, so that due to the alternate energizing of the lamps 61 it is possible to produce the impression of a running animal, for example. Of course, this effect can be modified further by shifting the block 64 so as to enlarge or contract the image and by turning the bar 63 so as to cause the image to move across the sheet means while the alternating light sources give the impression of galloping or running.

FIG. 7 shows an electrical circuit in which the lamps 61 are located. Thus it will be seen that the batteries 71 are connected electrically with the right lamp 61 of FIG. 7 through the switch 72 as well as through the switch 73.

This switch 73 includes a switch member 73a which is normally closed and a switch member 73b which is normally open, and there is shown diagrammatically in FIG. 7 a spring 80 which urges the switch member 73 to its closed position and the switch member 73b to its open position, these switch members being interconnected for simultaneous movement so that when the switch member 73b closes the switch member 73a opens while when the switch member 73b opens the switch member 73a necessarily closes. Although a spring 80 is shown in FIG. 7 it is to be understood that these switch members may be in the form of a pair of simple leaf springs interconnected with each other and having the position illustrated in FIG. 7 through their inherent resiliency. Thus, with this construction when the operator closes the switch 72 only the right lamp 61 of FIG. 7 will become energized, the switch 73a being closed at this time. However, with the switch 72 remaining closed, the operator may depress the switch 73 in opposition to the spring 80 so as to close the switch member 73b and open the switch member 73a, and in this way the left lamp 61 of FIG. 7 will become energized, while when the operator releases the switch 73 the spring 80 will return it to the position illustrated in FIG. 7 and the right lamp 61 will now become energized. Thus, by repeated depression and release of the switch 73 it is possible to alternately energize the light sources 61 to produce the results described above.

Thus, with the embodiment of FIGS. 5-7 the operator need only remove the translucent sheet means 57 in order to have access to the interior of the housing. It will be noted that the removal of the sheet means 57 also enables the operator to replace one or the other of the lamps 61, as required. With the sheet means 57 removed the operator can place a transparency between the guide ribs 59 to produce results very similar to that of FIGS. 1-3, except that in this case it is the lamp which moves while the transparency remains stationary, and of course in addition it is possible with this embodiment to give the impression of horizontal movement across the vertical sheet means 57 during turning of the bar 63. However, instead of placing a transparency in the housing, the operator may place the stage 75 on the support 74 and may place a suitable figure 76 on the stage, and then after the sheet means 57 is replaced, the operator, after closing the switch 72, can repeatedly depress and release the switch 73 to produce the results described above. Of course, when it is desired to use only one lamp, the operator only closes the switch 72.

It is to be emphasized that the structure described above is not only suitable for providing enlarged images, whether in the form of transparency images or silhouettes, but in addition this construction can be used to give the effect of movement of the images or silhouettes, and in this connection it is possible to place in the housing 51 a transparency showing heavenly bodies, such as stars, planets, and the like, and with such a transparency the movement of the substantially pin-point light source means 60 toward and away from the sheet means 57 as well as laterally with respect thereto gives a very effective impression of movement of the heavenly bodies, so that the structure is not only entertaining but also highly instructive.

It is also emphasized that with the structure of the invention there are absolutely no optical elements such as lenses similar to those which are included in the objective of a conventional enlarger, and of course there are no condenser lenses or the like, and in addition it is completely unnecessary to provide any cooling fans or the like since the heat generated by the extremely small light source means is negligible. Thus, the structure is extremely simple and inexpensive and is of course very simple to operate and has very little in it that can become faulty.

It will be understood that each of the elements described above, or two or more together, may also find a useful application in other types of viewing devices differing from the types described above.

While the invention has been illustrated and described as embodied in adjustable viewing devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A viewing device comprising, in combination, a hollow housing having a cover in the form of a translucent sheet the front of which is visible to the viewer of the device; a stationary light source located in said housing adjacent to a wall thereof which is parallel to said cover and located distant therefrom; a transparent support plate located between and parallel to said wall and cover, said plate being situated between said light source and cover so that an article on said support plate will have its image projected to said cover to be visible at the front thereof and manually operable adjusting means accessible in par at the exterior of said housing and having an interior portion, located within said housing, and operatively connected to said support plate for adjusting the position thereof relative to said cover while maintaining said plate parallel to said cover, said cover being hingedly connected to said housing so as to be turnable from a closed position closing said housing to an open position giving access to said support plate, and said support plate also being hingedly connected to said adjusting means so that said support plate can be turned away from said light source to give access thereto.

References Cited by the Examiner

UNITED STATES PATENTS

| | | |
|---|---|---|
| 1,240,379 | 9/1917 | Sheppard. |
| 1,730,883 | 10/1929 | Grant _____ 40—158 |
| 2,077,111 | 4/1937 | Kent _____ 40—130 |
| 2,842,882 | 7/1958 | Greene et al. _____ 40—158 |
| 2,937,564 | 5/1960 | Halford _____ 40—106.52 X |

EUGENE R. CAPOZIO, *Primary Examiner.*

JEROME SCHNALL, *Examiner.*